Oct. 6, 1964     J. R. BAXTER ETAL     3,152,316
GLIDE PATH GUIDANCE MEANS FOR AIRCRAFT
Filed Nov. 13, 1961

United States Patent Office 3,152,316
Patented Oct. 6, 1964

3,152,316
GLIDE PATH GUIDANCE MEANS FOR AIRCRAFT
John Russell Baxter, Chadstone, Victoria, Ronald William Cumming, Brighton, Victoria, Douglas Bruce Fraser, Briar Hill, Victoria, and John Charles Lane, Camberwell, Victoria, Australia, assignors to Commonwealth of Australia, Crown Solicitor's Office, Canberra, New South Wales, Australia
Filed Nov. 13, 1961, Ser. No. 151,903
Claims priority, application Australia, Nov. 16, 1960, 66,622/60, Patent 252,525
5 Claims. (Cl. 340—26)

This invention relates to improved glide path guidance means for aircraft and is concerned more particularly with means for installation on the ground to provide the pilot of an aircraft with visual information in order to indicate to the pilot the position of his aircraft relative to a predetermined glide path, whereby a proper approach of the aircraft to a runway is facilitated.

An object of the invention is to provide glide path guidance means which is effective for considerable distances, and which overcomes disadvantages experienced with existing installations.

With this object in view the present invention broadly resides in the provision of a plurality of simultaneously illuminated lights in a line extending in a longitudinal direction relative to a runway, whereby said lights when visible to the pilot of an approaching aircraft will appear in a line to him, said lights being provided with angular cut-off means whereby each light is visible to the pilot only between a particular range of inclinations of his line of sight to that particular light, the said ranges differing for different lights so that the particular pattern of lights in the line as seen by the pilot changes automatically in accordance with the departure of the aircraft above or below the desired glide path and thus provides glide path information for him.

Preferably the glide path guidance means includes a reference display providing a transverse line of light visible to the pilot, and the lights having the cut-off means are arranged to display to the pilot a line extending above or below the reference line according as to whether the aircraft is above or below the desired glide path.

Figure 1:
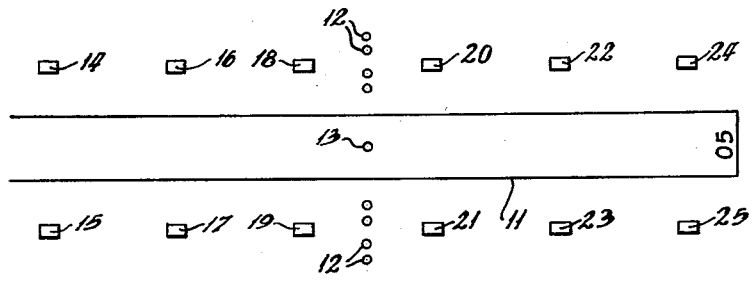
Figure 2:
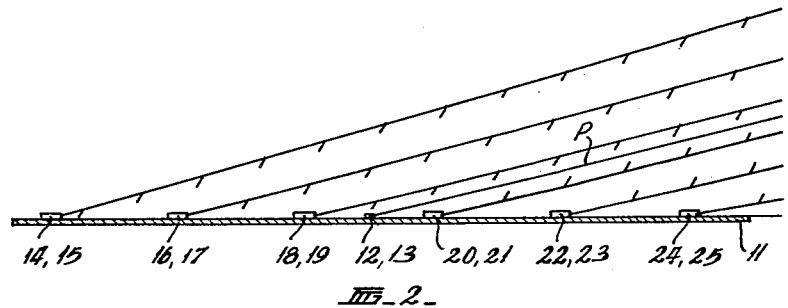
Figures 3, 4:
Figure 5:
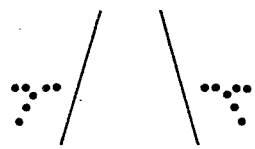

In the following more detailed description reference is made to the accompanying drawings wherein:

FIGURE 1 is a schematic plan view, not to scale, of an aircraft runway provided with glide path guidance means according to one particular form of the invention, FIGURE 2 is a schematic view in side elevation of the same runway, FIGURE 3 is a diagram showing the display visible to a pilot of an aircraft approaching the runway of FIGURES 1 and 2 on the correct glide path, FIGURE 4 is a diagram similar to FIGURE 3 showing the display when the aircraft is above the correct glide path, and FIGURE 5 is a diagram similar to FIGURE 3 showing the display when the aircraft is below the correct glide path.

In accordance with the particular form of the invention illustrated in FIGURES 1 and 2 glide path guidance means is installed at each side of a runway 11 and comprises two bars of lights 12 which extend transversely to the runway, in line with a central aiming point 13, one bar at each side of the runway. These lights are white lights which are visible from all directions and they provide to pilots a reference display of a white line broken in the middle by the runway itself.

The guide means includes twelve further lighting units 14 to 25 inclusive which are illuminated simultaneously, six on each side of the runway, in a symmetrical arrangement. At each side of the runway the six lighting units are placed in a straight line running parallel to the runway at a distance of 100 feet from the runway lights, three at each side of the transverse bar of lights. The six lighting units at each side are spaced at 300 feet intervals from each other, and the transverse bar bisects the interval between the two centremost lighting units.

Each of the lighting units 14 to 25 at each side comprises a white light or battery of lights directed generally in the direction towards an aircraft approaching the runway in the correct manner. Each of the light sources is provided with a sharp cut-off means so that the light is seen only when the line of sight from the viewer is within a predetermined range of angles of inclination to the light in question.

The lighting units 20 to 25 inclusive at the threshold side of the transverse bar of lights 12 have their cut-off means disposed to cut off light above a predetermined angle of inclination, while the lights 14 to 19 inclusive at the opposite side of the transverse bar have their cut-off means disposed to cut off light below a predetermined angle of inclination. Moreover, the angle of inclination at which cut off occurs is increased progressively, proceeding from the lighting unit nearest to the threshold. Thus in one particular arrangement the lighting units 24, 25 nearest to the threshold are arranged to cut off light for all lines of sight above an inclination of 2°42'. The next units 22, 23 are arranged to cut off above 2°47', and the third units 20, 21 are arranged to cut off above 2°52' which is the correct glide path angle for this arrangement. The fourth pair of lighting units 18, 19 which are the ones directly beyond the transverse bar are arranged to cut off at angles below 2°52', and the next two pairs of lighting units 16, 17 and 14, 15 are arranged to cut off below 2°59', and 3°6' respectively. The lines of sight at which cut-off occurs for these particular angles are indicated in FIGURE 2, although this figure is not to scale and the angles are exaggerated for clarity of illustration. In the case of each line of sight the short hatching lines at one side indicate that the lights from which that line of sight extends are not visible at that side of the line but are visible at the other side of the line. As the cut-off angle for the lights 18, 19 is the same as that for the lights 20, 21 their lines of sight are parallel to each other and to the correct glide path P through the central aiming point 13. The other lines of sight from the lights 14, 15, 16, 17, 22, 23 and 24, 25, all diverge from the glide path P. As a result of this arrangement, a pilot approaching the aiming point 13 on the correct glide path P will see only the transverse bar of lights 12. The display of the runway and lights which appears to the pilot in this case is shown in FIGURE 3. If the aircraft rises above the guide path angle the pilot will see one, two or all three of the lights beyond the transverse bar, according to his angular deviation above the correct glide path, i.e. according to the number of the marked lines of sight which he has crossed. FIGURE 4 shows the display of the runway lights which appears to the pilot at a position above all the lines of sight marked in FIGURE 2. Similarly as the aircraft moves below the correct glide path the pilot will see firstly one, then two and then all three of the lights at the threshold side of each of the two sections of the transverse bar. FIGURE 5 shows the display of the runway and lights which appears to the pilot at a position below all the lines of sight marked in FIGURE 2.

Thus if the pilot is not in the correct glide path, or within a permissible range of variation therefrom, he will see, in addition to the transverse bar, one or more of the additional lights at each side of the runway, and the visual impression will be that of a letter "T" at each side of the runway. If the pilot is below the correct guide path the letter "T" will be erect, as indicated by FIGURE 5 for example, and will be taken as an indication to fly up, whereas if the pilot is above the correct glide path the letter "T" will be inverted, such as shown in FIGURE 4, and will be taken as an indication to fly down. The stem of the letter "T" will be more or less elongated, according to the number of lights which are visible, and therefore the length of the "T" provides a measure of the extent of correction which the pilot must make to his particular glide path.

An important feature of this particular form of the invention is that the visual display to the pilot, when his aircraft is not within the permissible range of variation from the correct glide path, is not merely a warning of his position but is also a direct visual injunction to alter his glide path in the sense needed to bring his aircraft within the permissible range.

The system described is advantageous in that all the elements thereof may be sited on the ground, and the psychological hazard of frangible poles supporting elevated lights is avoided. A further advantage is that the lights of the system may all be of the same colour which in most cases will be white although for some conditions a colour other than white may be desirable to provide maximum contrast. This avoids the necessity of the pilot being required to make color discriminations, and also does not require a departure from the usual convention of "red for danger." The guiding means can be readily installed for most existing runways, and its sensitivity does not vary to any great extent with range.

While it has been indicated that the spacing between the lighting units and the transverse bar may be uniform, it may be preferred to vary the spacing, and in particular the spacing of the lighting units nearest to the transverse bar may be reduced to less than 150 feet or increased beyond that distance.

It should also be understood that the invention is not to be regarded as limited to the particular angles of cut-off of the lights mentioned above, particularly as different installations will require different glide path angles. In general it is desirable that the cut off angles of the light fittings nearest to the transverse bar of lights should be equal to the glide path angle and that those of the remaining fittings should be varied by from five to seven minutes of arc for each pair of fittings. Thus in the particular example described previously the variation at the threshold side of the transverse bar is five minutes and that at the opposite side is seven minutes. This has been found to be very satisfactory in practice.

We claim:

1. Glide path guidance means for aircraft comprising:
   a bar of lights extending transversely to a runway in line with an aiming point on the runway,
   said lights being visible from all elevated positions in the vicinity of the runway, and
   a plurality of partially screened lights spaced at intervals in a line extending in a longitudinal direction beside said runway,
   some of said screened lights being located on the threshold side of the transverse bar of lights and the others being located on the opposite side of said transverse bar,
   each of said screened lights being provided with cut-off means whereby it is visible to the pilot of an aircraft approaching the runway from the threshold end, only between a particular range of angles of inclination of his line of sight to that particular light,
   the said ranges differing for different lights whereby the display of lights visible to the pilot provides glide path information for him.

2. Glide path guidance means according to claim 1 wherein:
   the cut-off means of the screened lights at the threshold side of the transverse bar of lights are arranged to cut off vision of said lights at all angles of inclination of line of sight greater than a predetermined angle which is not greater than a selected glide path angle for said runway, and wherein
   the cut-off means of the screened lights at the opposite side of the transverse bar of lights are arranged to cut off vision of said lights at all angles of inclination of line of sight less than a predetermined angle which is not less than the selected glide path angle for said runway.

3. Guide path guidance means according to claim 2 wherein:
   the cut-off means of the screened lights at the threshold side of the transverse bar of lights are arranged so that the angles of inclination of line of sight at which vision of said lights is cut off increase progressively with each screened light, proceeding from the threshold towards the transverse bar of lights and wherein
   the cut-off means of the screened lights at the opposite side of the transverse bar of lights from the threshold are arranged so that the angles of inclination of line of sight at which vision is cut off increase progressively with each screened light, proceeding from the transverse bar of lights away from the threshold.

4. Glide path guidance means for aircraft comprising:
   a bar of lights extending transversely to a runway in line with an aiming point on the runway,
   said lights being visible from all elevated positions in the vicinity of the runway,
   a first partially screened light located at the side of the runway at the threshold side of said transverse bar of lights and being provided with cut-off means whereby it is visible to the pilot of an aircraft approaching the runway from the threshold end, only when the angle of inclination of his line of sight to the said first partially screened light is less than the selected glide path angle for said runway,
   a second partially screened light located at the side of the runway in longitudinal alignment with the first partially screened light and at the opposite side of the transverse bar therefrom,
   said second partially screened light being provided with cut-off means whereby it is visible to the pilot of an aircraft approaching the runway from the threshold end, only when the angle of inclination of his line of sight to the said second partially screened light is greater than the selected glide path angle for said runway,
   other partially screened lights located at the side of the runway and being spaced from the first partially screened light and from each other towards the threshold in a line in longitudinal alignment with the first and second partially screened lights,
   each of said other partially screened lights being provided with cut-off means whereby it is visible to the pilot of an aircraft approaching the runway from the threshold end, only when the angle of inclination of his line of sight to that partially screened light is less than the selected glide path angle for said runway by an amount which is increased progressively for each of said other partially screened lights proceeding towards the threshold, and
   further partially screened lights located at the side of the runway and being spaced from the second partially screened light and from each other away from the threshold in a line in longitudinal alignment with the first and second partially screened lights,
   each of said further partially screened lights being provided with cut-off means whereby it is visible to the pilot of an aircraft approaching the runway from the threshold end, only when the angle of inclination of his line of sight to that partially screened light is greater than the selected glide path angle for said runway by an amount which is increased progressively for each of said further partially screened lights proceeding away from the transverse bar of lights.

5. Glide path guidance means for aircraft comprising;
a plurality of spaced and simultaneously illuminated lights extending in a longitudinal direction relative to a runway, whereby said lights when visible to the pilot of an approaching aircraft will appear in a line to him,
said lights being provided with angle cut-off means whereby each light is visible to the pilot only between a particular range of angles of inclination of his line of sight to that particular light,
said ranges differing for different lights so that the particular pattern of lights in the line as seen by the pilot changes automatically in accordance with the departure of the aircraft above or below the desired glide path,
and a reference display of lights always visible to the pilot and which are arranged generally transverse of said longitudinally arranged line of lights so as to establish a variable transverse and longitudinal light pattern providing glide path information for the pilot.

References Cited in the file of this patent
UNITED STATES PATENTS

| | | |
|---|---|---|
| 2,497,427 | Weiss | Feb. 14, 1950 |
| 2,989,727 | Germeshausen | June 20, 1961 |